United States Patent Office 3,072,591
Patented Jan. 8, 1963

3,072,591
MIXED ESTERS OF A TRIMETHYLOLALKANE AND VINYL CHLORIDE RESIN PLASTICIZED THEREWITH
Joseph Fath, Barrington, R.I., assignor to Thompson Chemical Company, Pawtucket, R.I., a corporation of Rhode Island
No Drawing. Filed Nov. 14, 1958, Ser. No. 773,832
9 Claims. (Cl. 260—31.6)

This invention relates to plasticized vinyl resins and to novel plasticizers to be incorporated therein. More particularly, the invention concerns new mixed organic carboxylic acid esters of polymethylolalkanes, and to vinyl resins plasticized therewith.

It has been established practice for many years to use ester type plasticizers in conjunction with vinyl resins in order to impart to end products made from such resins requisite properties of flexibility, low volatility, color and heat stability, and toughness. In this way the usefulness of vinyl resins has been expanded to a point where they have found wide application in a variety of commercial products, including, for example, electrical insulation coatings for wire, floor tile, calendered sheeting, upholstery film, draperies, protective coverings, profile extrusion for welting, coving, gaskets, injection molded compounds for plugs, toys, machine parts, decorative finishes, and many other applications. The plasticizers which have heretofore been employed in largest volume in vinyl resins have been esters of various alcohols with dibasic organic acids such as phthalic, sebacic, and adipic acids. For more specific applications it is known to use as plasticizers for polyvinyl chloride esters of polyhydric alcohols which contain at least three hydroxy groups, such as, for example, pentaerythritol tetrabenzoate, pentaerythritol tetrahexanoate, or dipentaerythritol hexahexanoate, as well as mixed esters of pentaerythritol with two different aliphatic carboxylic acids.

The polyhydroxy alcohol esters heretofore proposed for use with vinyl resins have been either wholly aromatic or wholly aliphatic carboxylic acid esters. With respect to their properties as plasticizers, these known esters are characterized by extremely good heat stability and heat aging properties combined with unusually good electrical insulation qualities and resistance to degradation of these insulation values upon prolonged exposure to water. These properties have made the known plasticizers valuable for electrical wire insulation to meet specifications which could not be met by the commoner plasticizers. Nevertheless, the known polyhydroxy-alcohol ester plasticizers have been found to possess definite shortcomings which appear to be inherent in their chemical structure. Thus, for example, pentaerythritol tetrabenzoate while reducing the fusion temperature of polyvinyl chloride, yields stiff, inflexible compositions upon cooling of the mixes to room temperature. In the case of wholly aliphatic acid esters of polyhydroxy alcohols such as pentaerythritol and the trimethylolalkanes, it has been found by experience that definite limits of compatibility exist with respect to vinyl resins. Thus, for example, an ester of these polyols derived entirely from a six carbon fatty acid or from a mixture of aliphatic acids averaging six carbons represents an absolute upper limit of compatibility with polyvinyl chloride, and in the loop spew test, which involves dimensional stress, exudation of plasticizer is found to take place. Esters of aliphatic acids having fewer than six carbon atoms, while better from the standpoint of compatibility, are excessively volatile and do not, under the standard Underwriters' Laboratories test of seven days' aging at 136° C., meet the specified retention of plasticity as reflected by ultimate elongation measurements. Thus, both the lower molecular weight acid esters and the six carbon acid esters, while providing good electrical properties, do not confer upon vinyl resins the resistance to high heat aging which is considered satisfactory under standard tests.

In accordance with this invention, it has been found that vinyl resins may be plasticized to yield compositions which are outstanding from the standpoint of plasticizer volatility, compatibility and permanence, by employing as novel plasticizers one or more aromatic-aliphatic carboxylic acid mixed esters of a polymethylolalkane containing at least three methylol groups, wherein one mol of the polymethylolalkane is esterified with at least one mol of an aromatic acid, and the remaining methylol groups are esterified with a saturated aliphatic acid having a carbon content of not less than six carbon atoms, or with a mixture of saturated aliphatic acids representing an average carbon content of not less than six carbon atoms.

It has been found, surprisingly and unexpectedly, that the use of the aromatic-aliphatic carboxylic acid polyol mixed esters of this invention as plasticizers for vinyl resins, permits an increase in the number of carbon atoms of the acid groups present without thereby exceeding the permissible limits of compatibility. It has also been found, entirely unexpectedly, that at the same time the volatility of the new types of plasticizers is greatly diminished, thus conferring upon these plasticizers an outstanding degree of permanence. The volatility of the plasticizers in which an aromatic ester group is present is so much lower than that of the corresponding wholly aliphatic esters that it is entirely out of proportion merely to any change in molecular weight, but may be attributable to their unique solvating character. The novel plasticizers of this invention, in comparison with standard plasticizers, confer upon vinyl resin products in which they are used, greatly improved electrical properties and the retention of these properties and the retention of these properties upon aging in water. In comparison with wholly aliphatic esters they impart a high degree of compatibility, very low volatility, and good heat aging characteristics. Thus, in comparison with the wholly aliphatic esters, they impart a degree of permanence which is far beyond that attainable with wholly aliphatic esters. Vinyl resin compositions containing the mixed aromatic-aliphatic acid esters of this invention withstand heat exposure under which compositions prepared from the wholly aliphatic esters would break down and become quite useless. Furthermore, the presence of an aromatic acid group in the molecule enables higher aliphatic acid groups to be present without the danger of incompatibility with the resins. Esters based entirely on such higher aliphatic acids would be completely incompatible and would in many cases not even solvate these resins to form a continuous phase.

It is an additional advantage of the novel plasticizers of this invention that where other characteristics such as low temperature specifications and low temperature efficiency must be provided, mixtures of two or more of the new plasticizers may be employed to achieve any desired result.

The polymethylolalkanes which contain at least three methylol groups and which serve as the basis for the novel vinyl resin plasticizers of this invention include not only the methylol substituted aliphatic hydrocarbons but combinations thereof linked together by means of ether type linkages. Examples of polymethylolalkanes, in accordance with this definition include trimethylolethane, trimethylolpropane, trimethylolbutane, and trimethylolheptane, and further include pentaerythritol (tetramethylolmethane), the so-called polypentaerythritols derived therefrom, such as dipentaerythritol, an ether linked derivative containing six methylol groups, and also tripentaerythritol containing eight methylol groups, as well as the other higher related condensed ether-type analogues of the polymethylolalkanes. All of these compounds contain primary esterifiable hydroxy groups.

As mentioned previously, the novel aromatic-aliphatic acid mixed ester plasticizers of this invention are esterified by at least one aromatic acid group. The plasticizers of this invention are advantageously derived from one or more aromatic monocarboxylic acids containing from seven carbon atoms upward. Examples of preferred aromatic acids include benzoic acid, alkylbenzoic acids such as toluic acid, p-tert.-butylbenzoic acid, dimethylbenzoic acid, trimethylbenzoic acid, propylbenzoic acid and ethylbenzoic acid, as well as benzoylbenzoic acid and naphthoic acid. These acids are suitable in any of their isomeric forms, or any suitable mixtures thereof may be employed for esterification.

The novel polymethylolalkane esters which have been found to be outstanding vinyl resin plasticizers in accordance with this invention are those in which the methylol groups not esterified by one or more aromatic acid groups are esterified by saturated aliphatic carboxylic acids in which the aliphatic acid groups present represent an average carbon content of not less than six carbon atoms. This average content of not less than six carbon atoms may be achieved by the use of individual aliphatic carboxylic acids which range in carbon content from 6 to 18 carbon atoms, or by the use of combinations of aliphatic acids which range in carbon content from four to eighteen carbon atoms. Examples of suitable aliphatic acids include caproic (hexanoic), caprylic, pelargonic, capric (decanoic), 2-ethylhexoic, isodecanoic, 2-ethylheptanoic, isohexoic, 2- or 3-methylpentanoic, lauric, and tridecanoic acids. However, for the esterification of one or more individual methylol groups, commercial mixtures of aliphatic acids may also be used, for example, mixtures of acids averaging six carbon atoms.

The plasticizer esters of this invention may be used to plasticize vinyl resins of all types, both as primary plasticizers and in association with secondary plasticizers. The vinyl resins with which these plasticizers are suitable for use include those obtained by polymerization or copolymerization of vinyl monomers generally, such as, for example, vinyl esters, vinyl ethers, vinylidene esters, styrene, acrylonitrile, and esters of acrylic and methacrylic acids. Vinyl resins to which the invention is especially well suited are those obtained from polyvinyl halides, such as unmodified polyvinyl chloride resins, of all types and molecular weights, or co-polymers thereof with vinyl esters, such as vinyl acetate, or with esters of acrylic acid such as ethyl acrylate, maleic acid, e.g. butyl maleate, or with higher vinyl ethers, vinylidene chloride, acrylonitrile, and the like. However, the plasticizers may also be used in conjunction with other vinyl polymers or mixtures thereof including, for example, polyvinyl alcohol, polyvinyl acetate, polyvinyl butyral, polyvinyl formal, polyvinyl isobutyl ether, polyvinyl methyl ether, polyvinyl bromide, polyvinylidene chloride, polyethyl acrylate, methyl acrylate, and methyl methacrylate.

Utilizing the novel plasticizers of this invention, vinyl resin formulations can be prepared with a wide range of properties, depending upon the proportion of plasticizer used. In accordance with the present invention, the proportion of plasticizer added may vary widely, ranging from about 3 to about 200 percent of plasticizer by weight of the resin content. Preferably, the proportion of plasticizer added will range from about 5 to about 150 percent by weight of the resin content. These plasticizers can either be used as such, or they can be formulated together with other types of plasticizers, such as, for example, epoxidized fatty acid esters, polymeric plasticizers, phthalate plasticizers, adipic acid esters, hydrocarbons, and numerous other types commonly used in this art.

The vinyl resin compositions can be compounded further with commonly used stabilizers such as dibasic lead silicate, carbonate, sulfate, phthalate, or phosphite, or barium-cadmium octoate, laurate, or ricinoleate, zinc stearate, calcium stearate, and other metallic soaps. Auxiliary stabilizers may be similarly employed, such as, for example, organic phosphites, phenols, pentaerythritol, and others. The compositions may also contain the commonly used fillers and pigments, such as clays, calcium carbonate, silicates, barytes, and the like, for enhanced appearance.

The novel mixed esters of polymethylolalkanes wherein one mol of the polymethylolalkane is esterified with at least one mol of an aromatic carboxylic acid, and the remaining methylol groups are esterified with a saturated aliphatic carboxylic acid having a carbon content of not less than six carbon atoms, or with a mixture of saturated aliphatic carboxylic acids representing an average carbon content of not less than six carbon atoms, and which have been found to be valuable vinyl resin plasticizers, in accordance with this invention, are new compounds, not described in the prior art.

Examples of novel mixed esters derived from 1 mol of aromatic acid include:

Trimethylolethane monobenzoate dihexoate
Trimethylolethane monobenzoate dicaprylate
Trimethylolethane monotoluate di-2-ethylhexoate
Trimethylolethane monotoluate dicaprylate
Trimethylolpropane monobenzoate di-isohexoate
Trimethylolpropane (benzoate)$_{1.5}$ (caprylate)$_{1.5}$
Trimethylolpropane (benzoate)$_{1.8}$ (isodecanoate)$_{1.2}$
Trimethylolbutane monobenzoate mono-p-tert.-butylbenzoate mono-(mixed fatty acids)
Pentaerythritol monobenzoate tricaprylate
Pentaerythritol monobenzoate tripelargonate
Pentaerythritol monobenzoate tridecanoate
Pentaerythritol (benzoate)$_1$. (C$_{7.5}$ average carbon content fatty acid)$_{1.5}$ Examples of mixed esters containing two or more aromatic ester groups include:

Trimethylolethan dibenzoate monocaprylate
Trimethylolethane dibenzoate monocaprate
Trimethylolethane dibenzoate monolaurate
Trimethylolethane ditoluate monopelargonate
Trimethylolethane ditoluate mono-2-ethylheptanoate
Trimethylolpropane dibenzoate monolaurate
Trimethylolpropane dibenzoate monocaprate
Trimethylolpropane dibenzoate monopelargonate
Trimethylolpropane ditoluate monolaurate
Trimethylolpropane ditoluate monopelargonate
Trimethylolpropane (benzoate)$_{1.5}$ (caprylate)$_{1.5}$
Trimethylolpropane (benzoate)$_{1.5}$ (pelargonate)$_{1.5}$
Trimethylolbutane ditoluate monocaprylate
Trimethylolheptane dibenzoate mono-3-methylpentanoate
Pentaerythritol dibenzoate dicaprylate
Pentaerythritol dibenzoate dipelargonate
Pentaerythritol dibenzoate dicaprate
Pentaerythritol dibenzoate di-2-ethylhexoate
Pentaerythritol tribenzoate monolaurate
Pentaerythritol tribenzoate monoisodecanoate
Pentaerythritol tritoluate monopelargonate
Pentaerythritol tritoluate monoisodecanoate
Dipentaerythritol tribenzoate tricaprylate
Dipentaerythritol tetrabenzoate dipelargonate
Dipentaerythritol pentabenzoate monotridecanoate The novel plasticizers of this invention are prepared by first heating the polymethylolalkane with an aromatic carboxylic acid of the type indicated with accompanying elimination of water by elevated temperatures or azeotropic distillation in accordance with conventional procedures, until this phase of the esterification is essentially complete, either in presence or absence of a suitable esterification catalyst. At the end of this reaction, the requisite amount of the aliphatic acid or mixture of aliphatic acids is added to the esterification mixture, along with a catalyst, such as sulfuric acid or para-toluene sulfonic acid, and the esterification is continued to completion, i.e. to a point at which all the existing methylol groups have been fully esterified. Any excess acids present at this point are then removed by neutralization with alkalies. The finished product is washed and dried in such manner as to remove residual water and solvents which may be used in the course of the esterification. In accordance with the preferred procedure of this invention, that portion of the methylol groups which is to be combined with the aromatic acids is esterified at a relatively high temperature, for example, from 150° to 250° C., followed by esterification of the remaining methylol groups with the aliphatic acids at a relatively low temperature, such as for example from about 125° to 150° C. This procedure assures the formation of true mixed esters, rather than merely a physical mixture of two or more wholly aromatic or wholly aliphatic acids.

The following examples serve to illustrate the preparation of the novel mixed esters of this invention, but are not to be considered as limiting with respect thereto:

EXAMPLE 1

*Trimethylolethane Dibenzoate Monolaurate*

To 120 grams of trimethylolethane (1.0 mol) were added 244 grams of benzoic acid (2.0 mols) and 50 cc. benzene. The reaction mixture was heated with agitation. At approximately 100° C, a clear solution was obtained. The temperature was raised to 175° C., and the mixture refluxed with constant elimination of water. During the course of the reaction the temperature was slowly raised to 210° C. until 36 cc. water has been eliminated. At this point the acid value of the solution was found to be 10. The temperature was lowered to 130° C. 220 gms. of commercially pure lauric acid (97%–1.1 mol) and 5 g. paratoluenesulfonic acid were added and reflux was continued at 130–145° C. until an additional 18 cc. water had been received. The acid value of the solution was determined and found to be 25. The mixture was cooled to 65° C. and 200 cc. of benzene were added. It was then neutralized by addition of 900 cc. of 3% aqueous potassium hydroxide. The layers were permitted to separate and the oil layer was washed three times with water at 65° C. to remove residual alkalinity. The oil layer was then stripped under vacuum at temperatures up to 140° C. to remove excess benzene and water. The residue was filtered with 4 gms. of an asbestine filter aid. 459 gms. (90% of theory) of a light amber oil were obtained having a specific gravity of 1.052 and an acid value of 0.01. This product was trimethylolethane dibenzoate monolaurate.

EXAMPLE 2

*Dipentaerythritol Tetrabenzoate Dipelargonate*

258 gms. (1.0 mol) of a commercial grade of dipentaerythritol were fused with 488 g. (4.0 mols) benzoic acid and 80 cc. benzene. The mixture was refluxed at temperatures up to 230° C. until 72 cc. water had been given off. The acid value of the mixture was found to be 16. It was then cooled to 150° C. and 364 gms. (2.3 mols) pelargonic acid were added along with 2 gms. sulfuric acid and 50 cc. benzene. The mixture was refluxed until another 36 cc. water had been obtained. The acid value was found to be 30.5. The mixture was cooled to 70° C. under a nitrogen blanket and neutralized with 1000 cc. 5% aqueous sodium hydroxide. The layers were separated and the organic layer washed four times with water to remove excess caustic. It was then stripped under a vacuum of 18 mm. up to 145° C. to remove benzene and water. Upon filtration with 5 gms. of a filter clay 830 gms. of product were obtained constituting an 87% yield of dipentaerythritol tetrabenzoate dipelargonate.

EXAMPLE 3

*Trimethylolpropane (Benzoate)$_{1.8}$ (Isodecanoate)$_{1.2}$*

To 134 g. trimethylolpropane (1 mol) were added 220 gms. benzoic acid (1.8 mols) and 50 cc. benzene. The mixture was fused with agitation and heated until reflux temperature was obtained. It was refluxed with constant elimination of water at 170–220° C. until 36 cc. water were obtained. There were then added 232 g. isodecanoic acid (1.35 mols), 2 g. paratoluenesulfonic acid and 70 cc. benzene. Reflux was continued at 145–165° C. until an additional 18 cc. water had been obtained. The acid value was determined and found to be 32. The solution was cooled to 75° C. and neutralized by slowly adding 1000 cc. of a 5% sodium carbonate solution. The layers were separated, the organic layer was washed with water until neutral and stripped under vacuum to 150° C. in the presence of 2 g. activated charcoal. The residue was filtered. A light yellow oil was obtained which weighed 448 g. and consisted of trimethylolpropane (benzoate)$_{1.8}$ (isodecanoate)$_{1.2}$. This quantity represents a yield of 88.5% of theory.

The preferred method of applying the novel plasticizers to the improvement of vinyl resins is illustrated by the following examples:

EXAMPLE 4

*Compatibility Tests*

The compatibility of the novel plasticizers of this invention in comparison with that of known similar and wholly aliphatic types of plasticizers was tested as follows:

100 parts of a high molecular weight, unmodified polyvinyl chloride marked as "Trulon 500" were mixed with 70 parts of the plasticizer to be tested, 10 parts of an electrical grade clay and 5 parts of dibasic lead phthalate. The mixture was milled on a two roll, differential speed rolling mill for 10 minutes at 325° F. It was sheeted off at 0.080" thickness and molded for 3 minutes at 345° F. and 1000 lbs. per square inch in an ASTM 6" x 6" x 0.075" four cavity mold. From the moldings, 1" x 6" x 0.075" strips were cut and folded over into a loop. The loop was clamped into a bar leaving ¾" from the loop at its sharpest bend to the bar uncompressed. The looped specimens were examined after 24 hours at room temperature for evidence of exudation or oily beads of plasticizer at the point of greatest mechanical stress. The following results were obtained showing that the plasticizers of this invention are wholly compatible, and exhibit little or no exudation, whereas the corresponding wholly aliphatic esters are inferior in this respect.

| Plasticizer: | Exudate observed |
| --- | --- |
| Trimethylolethane dibenzoate monodecanoate | None. |
| | Heavy. |
| Trimethylolethane monotoluate dicaprylate | None. |
| Trimethylolethane tricaprylate | Moderate. |
| Pentaerythritol dibenzoate dipelargonate | None. |
| Pentaerythritol tetrapelargonate | Heavy. |
| Pentaerythritol tritoluate monoisodecanoate | None. |
| Pentaerythritol tetraisodecanoate | Heavy. |
| Pentaerythritol monobenzoate trihexoate | None. |
| Pentaerythritol tetrahexoate | Light. |
| Pentaerythritol (benzoate)$_{1.5}$ (C$_4$–C$_9$ fatty acids)$_{2.5}$[1] | None. |
| Pentaerythritol (C$_4$–C$_9$ fatty acid)$_4$[1] | Moderate. |
| Trimethylolpropane (benzoate)$_{1.5}$ (caprylate)$_{1.5}$ | None. |
| Trimethylolpropane tricaprylate | Moderate. |
| Trimethylolpropane ditoluate monolaurate | None. |
| Trimethylolpropane trilaurate | Heavy. |

[1] C$_4$–C$_9$ fatty acids have average molecular weight of 135.

EXAMPLE 5

*Stability Tests*

The stability of the compounds of this invention on exposure to high temperature aging as compared with previously known plasticizers was demonstrated in the following manner:

100 parts of a high molecular weight, electrical grade polyvinyl chloride resin were mixed with 60 parts of the plasticizers tested, 10 parts of an electrical grade clay, 5 parts of dibasic lead phthalate. The mixtures were milled on a two roll, differential speed mill for 10 minutes at 325° F. and sheeted off at 0.045" thickness. Specimens were cut from the sheets with a Type "C" Dumbbell Die as specified in ASTM D-412-51T. They were weighed on an analytical balance and placed in a mechanical convection oven for 7 days at 136° C. Unaged samples were retained as reference controls. At the end of the aging period, the weight losses were determined on the aged specimens and physical properties were obtained on all samples. The following results were obtained:

| Plasticizer Tested | Percent Weight Loss | Percent Retention of Ultimate Elongation |
| --- | --- | --- |
| Pentaerythritol Dibenzoate Dicaprylate | 1.7 | 90 |
| Trimethylolethane Dibenzoate Monolaurate | 1.0 | 93 |
| Trimethylolethane Ditoluate Pelargonate | 3.3 | 88 |
| Trimethylolpropane (Benzoate)$_{1.5}$ (Pelargonate)$_{1.5}$ | 2.6 | 92 |
| Trimethylolpropane Dibenzoate Caprate | 2.3 | 86 |
| Pentaerythritol (Benzoate)$_{1.5}$ (C$_{7.5}$ average carbon content fatty acid)$_{1.5}$ | 3.2 | 92 |
| Propylene glycol - adipic acid - lauric acid polymeric plasticizer | 4.4 | 79 |
| Di (2-ethylhexyl) phthalate | 28 | 0 |
| Pentaerythritol Tetra Ester of Fatty Acids having an average of 5.5 C atoms (highest compatible aliphatic ester) | 9.0 | 60 |
| Trimethylolethane Trihexoate | 18.0 | 35 |
| Trimethylolethane Tricaprylate | 12.4 | 55 |
| Trimethylolpropane Tricaprylate | 11.0 | 61 |
| Trimethylolpropane Trihexoate | 15.5 | 42 |

The data show that the mixed aromatic-aliphatic esters possess a high degree of retention of their original plasticity under severe aging conditions, whereas the heretofore known plasticizers retain little or none of their plasticizing action, thereby causing the essential deterioration of the vinyl composition.

EXAMPLE 6

Electrical Properties

The volume resistivity of vinyl resin compositions prepared using several plasticizers of this invention was determined on the specimens prepared in Example 5. Resistivity measurements were made by the method described by the American Society for Testing Materials Standards on Plastics and designated at ASTM D-257-54T. The test temperature was 60° C. Specimens freshly prepared as well as specimens submerged in distilled water for 7 days at 60° C. were tested. The following results were obtained:

| Plasticizer | Vol. Res. in ohm-cm. on Original Sample, 60° C. | Vol. Res. in ohm-cm. after H$_2$O Submersion for 7 days, 60° C. |
| --- | --- | --- |
| Trimethylolpropane dibenzoate pelargonate | 20×10$^{12}$ | 8×10$^{12}$ |
| Pentaerythritol Dibenzoate Dipelargonate | 15×10$^{12}$ | 6×10$^{12}$ |
| Trimethylolethane Monotoluate Dicaprylate | 13×10$^{12}$ | 4×10$^{12}$ |
| Di (2-ethylhexyl) Phthalate | 5×10$^{12}$ | 3×10$^{12}$ |
| Propylene Glycol - Adipic Acid - Lauric Acid-Polymeric Plasticizer | 1×10$^{12}$ | 0.09×10$^{12}$ |

The data show the plasticizers of this invention to impart to the vinyl compositions unusually high electrical insulation values, as well as to cause a high degree of retention of these values under severe exposure to moisture.

While preferred embodiments of the invention have been shown and described, it is to be understood that the invention is not confined to the specific compositions and methods herein set forth, and that changes and variations may be made therein without departing from the spirit of the invention, or exceeding the scope of the appended claims.

I claim:

1. An ester of trimethylolpropane, benzoic acid, and pelargonic acid wherein 1 mol of said trimethylolpropane is esterified with at least 1 mol of benzoic acid and the remaining methylol groups are esterified with pelargonic acid.

2. An aromatic-aliphatic carboxylic acid mixed ester of a trimethylolalkane wherein at least 1 methylol group is esterified with an aromatic monocarboxylic acid selected from the group consisting of benzoic, alkylbenzoic, benzoylbenzoic and naphthoic acid, and each of the remaining methylol groups is esterified with the same saturated aliphatic monocarboxylic acid having a carbon content of at least 6 carbon atoms, said ester possessing low volatility, good heat aging properties, and compatibility with vinyl chloride polymers.

3. The ester of claim 2 in which the trimethylolalkane is trimethylolpropane.

4. The ester of claim 2 in which the trimethylolalkane is trimethylolethane.

5. The ester of claim 2 in which the aromatic monocarboxylic acid is benzoic acid.

6. The ester of claim 2 in which the aromatic monocarboxylic acid is a toluic acid.

7. Trimethylolpropane dibenzoate monopelargonate.

8. Trimethylolpropane monobenzoate dipelargonate.

9. A vinyl chloride polymer selected from the group consisting of homopolymers of vinyl chloride and copolymers of vinyl chloride with a monoethylenically unsaturated monomer copolymerizable therewith, having incorporated therein as a plasticizer from about 3% to about 200% by weight of an aromatic-aliphatic carboxylic acid mixed ester of a trimethylolalkane wherein at least 1 methylol group is esterified with an aromatic monocarboxylic acid selected from the group consisting of benzoic, alkylbenzoic, benzoylbenzoic and naphthoic acid, and each of the remaining methylol groups is esterified with the same saturated aliphatic monocarboxylic acid having a carbon content of at least 6 carbon atoms, said ester possessing low volatility, good heat aging properties, and compatibility with vinyl chloride polymers.

References Cited in the file of this patent

UNITED STATES PATENTS

| | | |
| --- | --- | --- |
| 2,381,247 | Barth et al. | Aug. 7, 1945 |
| 2,448,520 | Cupery | Sept. 7, 1948 |
| 2,502,370 | Craver | Mar. 28, 1950 |
| 2,558,025 | Wicks | June 26, 1951 |
| 2,975,152 | Hurwitz et al. | Mar. 14, 1961 |